Sept. 29, 1964   J. J. DUFFY   3,150,567
VALVE SYSTEM FOR AUTOMATICALLY OPERATED SERVOS
Filed Oct. 9, 1961   3 Sheets-Sheet 2

INVENTOR:
JAMES J. DUFFY
BY
ATTORNEYS.

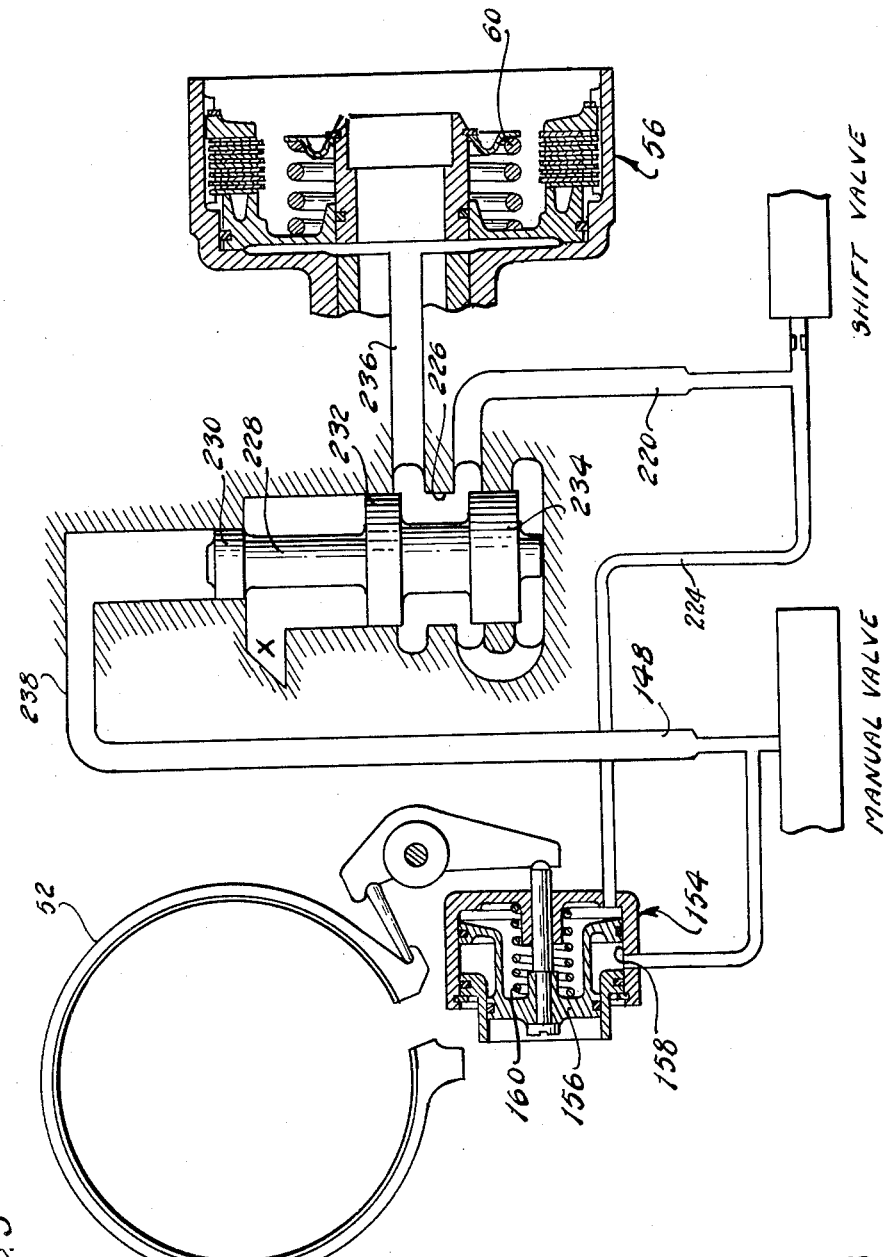

3,150,567
VALVE SYSTEM FOR AUTOMATICALLY
OPERATED SERVOS
James J. Duffy, Scottsdale, Ariz., assignor to Ford Motor
Company, Dearborn, Mich., a corporation of Delaware
Filed Oct. 9, 1961, Ser. No. 143,725
5 Claims. (Cl. 91—413)

My invention relates generally to automatic control valve systems and more particularly to an automatic control valve system for an automatic, multiple speed power transmission mechanism.

The improvement of my invention can be applied readily to multiple speed power transmission mechanisms for automotive vehicles. Such mechanisms usually include gear elements that define plural torque delivery paths between the vehicle engine and the power output member, the latter in turn being connected drivably to the vehicle traction wheels through a suitable torque transfer system. Each power flow path is characterized by a different speed ratio. Friction mechanisms such as friction clutches or brakes are included for the purpose of coupling together certain gears to establish one driving speed ratio or for anchoring certain gear elements to establish another speed ratio. A control valve system may be provided for controlling the operation of the clutches or brakes in sequence to establish a desired driving ratio. Such control systems normally are automatic in character and they respond to operating variables of the vehicle to condition the transmission for optimum performance for any given driving condition.

Transmission control systems of the fully automatic type normally comprise a fluid pressure source, such as an engine driven pump, together with appropriate conduit structure connecting the pressure source to servos for the clutches or brakes. Fluid pressure distribution valves are situated in the conduit structure to provide selective distribution of pressure to the servos to establish the desired shift sequence.

During a gear speed ratio change it sometimes is desirable to disengage a friction brake and engage a friction clutch in timed sequence. In the disclosed embodiment of the invention, such a sequential operation is necessary to initiate a shift from a relatively low speed ratio to direct drive or a high speed ratio. Conversely, to recondition the mechanism for operation in the lower speed ratio, the clutch must be disengaged and the brake reapplied in timed sequence.

For the purpose of obtaining timed sequential operation of the clutch and brake, the servo that is used for engaging the brake is double acting in character. It includes a working piston situated in a servo cylinder, the piston and the cylinder defining opposed fluid pressure chambers on either side of the piston. The clutch servo is single acting and includes a piston that energizes the friction members when fluid pressure is distributed thereto. A return spring is provided for releasing the clutch when fluid pressure is exhausted from the clutch servo. The pressure chamber on the release side of the brake piston is disposed in fluid communication with the clutch servo pressure chamber, and fluid pressure is distributed to both chambers by a common shift valve. If fluid pressure is applied to both sides of the brake piston and to the clutch servo, the clutch will be applied and the brake will be released. When the shift valve is shifted, however, the release side of the brake piston is exhausted together with the clutch servo pressure chamber, and the residual fluid pressure on the apply side of the brake piston will cause the brake to become applied as the clutch is released. The shift valve thus controls both a shift to a higher speed ratio from a lower speed ratio and, conversely, to a lower speed ratio from a higher speed ratio.

Suitable control pressure signals are applied to the shift valve for initiating automatic operation of the same. These signals usually are related functionally to the degree of engine torque demand and the vehicle speed. They can be utilized by the circuit to cause the shift valve to move either to an upshift position or a downshift position, as appropriate, so that a variety of different operating conditions will be satisfied. Once the shift valve is actuated, however, the timing of the operation of the brake servo with respect to the operation of the clutch servo will determine the degree of smoothness with which a speed ratio shift can be accomplished. If, for example, it is desired to initiate an upshift by de-energizing the transmission brake and actuating the clutch as above described, it is necessary for the shift valve to distribute working pressure to the release side of the brake servo piston to overcome the opposing pressure on the other side of the brake servo piston. The brake will remain applied as long as the fluid pressure on the release side of the brake servo piston is insufficient to overcome the opposing forces. This same pressure, of course, is distributed to the clutch. During the time interval in which the brake servo release pressure is building up, a simultaneous pressure build-up occurs in the clutch servo. This tends to cause initial engagement of the clutch before the brake band is released thus producing a so-called overlap in the operation of the clutch and the brake.

A certain degree of overlap is desirable in most instances since a complete interruption in the power delivery path through the gear elements during a shift sequence would result in a lack of smoothness in the acceleration of the vehicle. On the other hand, the overlap cannot be excessively long since this would result in a temporary locked-up condition of the gear elements. This would cause accelerated wear of the friction elements of the clutches and brakes and an undesirably rough shift during the acceleration period.

In my improved control system I have provided a mechanism for establishing the optimum timing between the operation of the transmission clutch and brake. It includes a so-called interrupter valve structure disposed in the circuitry that is common to the clutch and the brake. During a shift from a relatively low speed ratio to a relatively high speed ratio, full application of the clutch is delayed until the brake servo is de-energized. The duration of the delay in the operation of the clutch with respect to the operation of the brake can be controlled by calibrating appropriately the valve.

The provision of an improved circuit of the type above set forth being a principal object of my invention, it is a further object of my invention to provide a valve system for controlling the timing in the operation of two mutually dependent servos in a control circuit.

It is a further object of my invention to provide fluid pressure circuitry for a clutch servo and a brake servo that are disposed in fluid communication whereby distribution of fluid pressure to one servo can be controlled when common portions of the circuitry are pressurized.

It is a further object of my invention to provide an improved automatic power transmission control circuit having clutch and brake servos wherein the degree of overlap in the operation of the clutch and brake servos can be controlled.

Further objects and features of my invention will become apparent from the following description and from the accompanying drawings, wherein:

FIGURE 3 is an enlarged portion of the circuitry of FIGURE 2 showing in more particular detail the interrupter valve structure; and FIGURE 4 is a partial assembly view of a portion of the structure shown in FIGURE 3 with the interrupter valve in a different position than that illustrated in FIGURE 3.

Figure 1:
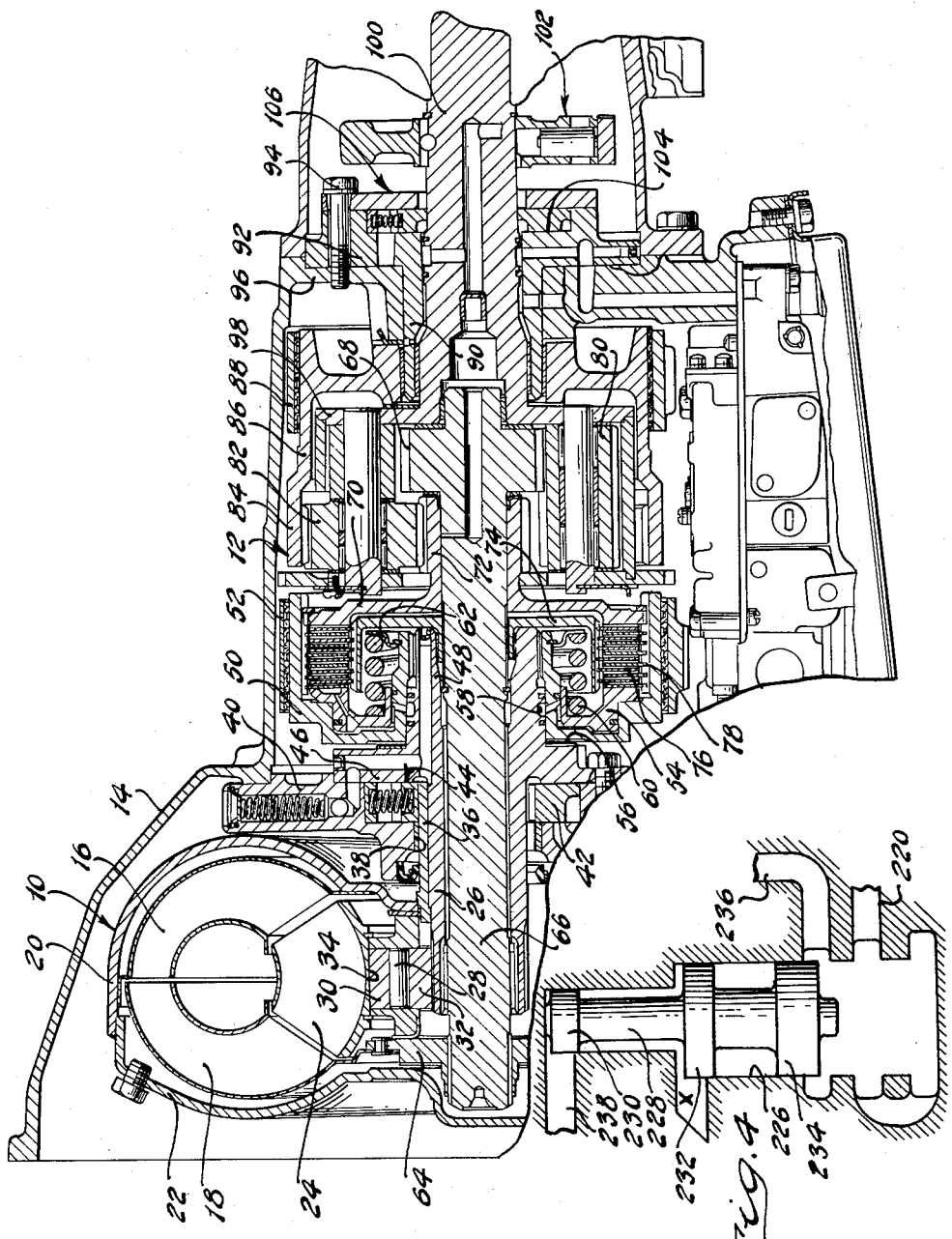
FIGURE 1 shows in cross section a multiple speed power transmission assembly that is capable of incorporating the improved circuit of my instant invention.

Referring first to FIGURE 1, numeral 10 designates generally a hydrokinetic torque converter unit and numeral 12 designates generally a planetary gear mechanism that is capable of providing two forward driving speed ratios and a single reverse speed ratio. The converter 10 and the gear unit 12 are situated within a common cast housing identified by reference character 14.

The torque converter unit comprises a bladed pump member 16 and a bladed turbine member 18. These members include toroidal shrouds that define a toroidal fluid flow path. The pump blades are disposed within the toroidal shrouds for the pump member and the turbine blades similarly are disposed between the shrouds for the turbine member. A pump shell 20 surrounds the converter unit 10 and the outer pump shroud is secured thereto as indicated at both the inner and outer margins. The periphery of the shell 20 is welded or otherwise secured to a drive plate 22 that may be connected to the crankshaft of a vehicle engine. The converter unit 10 includes also a bladed stator 24 situated between the exit section of the turbine member 18 and the entrance section of the pump member 16.

The torque converter stator 24 functions to alter the direction of the fluid flow of the fluid as it leaves the turbine before it passes to the inlet section of the pump member 16 thus producing a torque multiplication ratio in known fashion. The hydrodynamic torque reaction acting on the stator 24 is transmitted to a relatively stationary stator shaft 26 by means of an overrunning coupling. This coupling comprises a plurality of coupling elements 28 such as rollers situated between an outer coupling race 30 and a cooperating inner coupling race 32. The races 30 and 32 are arranged within an appropriate opening 34 in the hub of the stator 24.

The overrunning coupling elements 28 will permit free wheeling motion of the stator 24 in a reverse direction when the torque converter unit 10 assumes a coupling condition. When the torque converter unit functions in the torque multiplication range, however, overrunning motion of the stator 24 is inhibited.

The pump shell 20 is secured to a hub sleeve shaft 36 that is journaled within an opening 38 in a transverse wall 40 that separates the converter portion of the housing 14 from the gear portion thereof. The sleeve shaft 36 can be keyed or otherwise secured to a rotor 42 that forms a portion of a positive displacement pump generally identified by reference character 44. This pump forms a portion of the control circuit of FIGURE 2 as will subsequently be explained.

The stator shaft 26 is connected to an adapter 46 that is secured to the wall 40 by bolts or by other suitable fastening means. An extension 48 is formed on the adapter 46 and extends axially to provide support for a brake drum 50. A brake band 52 encircles the drum 50 and is actuated by means of a brake servo subsequently to be described. The brake drum 50 defines a fluid pressure cylinder within which an annular piston 54 is situated. The piston 54 and the cylinder define an annular working chamber 56 that may be pressurized by means of appropriate internal passage structure, a portion of which is designated by reference character 58.

Piston 54 normally is biased in a left-hand direction as viewed in FIGURE 1 by a piston return spring 60. A spring seat 62 anchors spring 60 and is held in place on an axial extension of the brake drum by means of a snap ring as indicated.

The outer shroud for the turbine member 18 is secured to a turbine hub 64 which in turn is splined to a turbine shaft 66. A first sun gear 68 is connected to shaft 66. A clutch member 70 is journaled upon the turbine shaft 66 and has secured thereto a second sun gear 72. Member 70 is keyed or splined at its periphery to the inner periphery of brake drum 50. A clutch member 74 is splined to shaft 66 and carries clutch discs 76 at its outer periphery. Member 74 is splined externally to accommodate internal splines on the clutch discs 76. Cooperating discs 78 are carried by the drum 50. The discs 76 and 78 can be urged into frictional clutching engagement by the piston 54 when the working chamber 56 is pressurized, the member 70 functioning as a back-up or reaction member for the clutch piston force.

Sun gear 68 is disposed in meshing engagement with long planet pinions 80 which drivably engage other planet pinions 82. Three pinions 80 and three pinions 82 are provided.

Pinions 82 engage both a ring gear 84 and aforementioned sun gear 72. Ring gear 84 forms a portion of a brake drum 86 about which is positioned a reverse brake band 88. It is journaled upon a stationary sleeve shaft 90 that forms a part of an adapter 92, the latter being secured by bolts 94 to an end wall 96 for the housing 14.

Pinions 82 and 80 are journaled upon pinion shafts that form a portion of a carrier generally identified by reference character 98. Carrier 98 is connected to a power output shaft 100 that may be connected to the vehicle drive shaft. A governor mechanism 102 is connected to the shaft 100 for rotation in unison therewith.

The adapter 92 defines a pump cavity 104 within which is situated a second positive displacement pump 106 that is connected drivably to the shaft 100. The pump 106 and the aforementioned pump 44 define a part of the control system of FIGURE 2.

To establish the lowest speed ratio, brake 52 is energized and the clutch assembly is de-energized. This being the case, sun gear 72 functions as a reaction member and sun gear 68 functions as a driving member. Engine torque delivered to the converter 10 is multiplied by the converter and transferred to the turbine shaft 66. Sun gear 68 then transfers the turbine shaft torque to pinions 80 that in turn drive pinions 82. Since sun gear 72 is stationary, the carrier 98 and the power output shaft 100 will tend to rotate in the same direction as the direction of rotation of shaft 66 although at a much reduced relative speed. To condition the mechanism for high speed operation, brake band 52 is released and the clutch assembly is applied. This causes the members of the gear unit 12 to become locked together for rotation with a speed ratio of unity. Thus the turbine shaft 66 rotates at the same speed as the speed of rotation of shaft 100.

To condition the mechanism for reverse drive operation, brake 88 is applied and brake 52 is released. The clutch assembly also is released. The turbine torque transferred to the sun gear 68 then will drive the pinions 80 that in turn drive pinions 82. But since the ring gear 84 is held stationary, the pinions 82 and the carrier 98 upon which they are journaled will revolve in a reverse direction within the stationary ring gear 84. This causes reverse rotation of the shaft 100.

Figure 2:
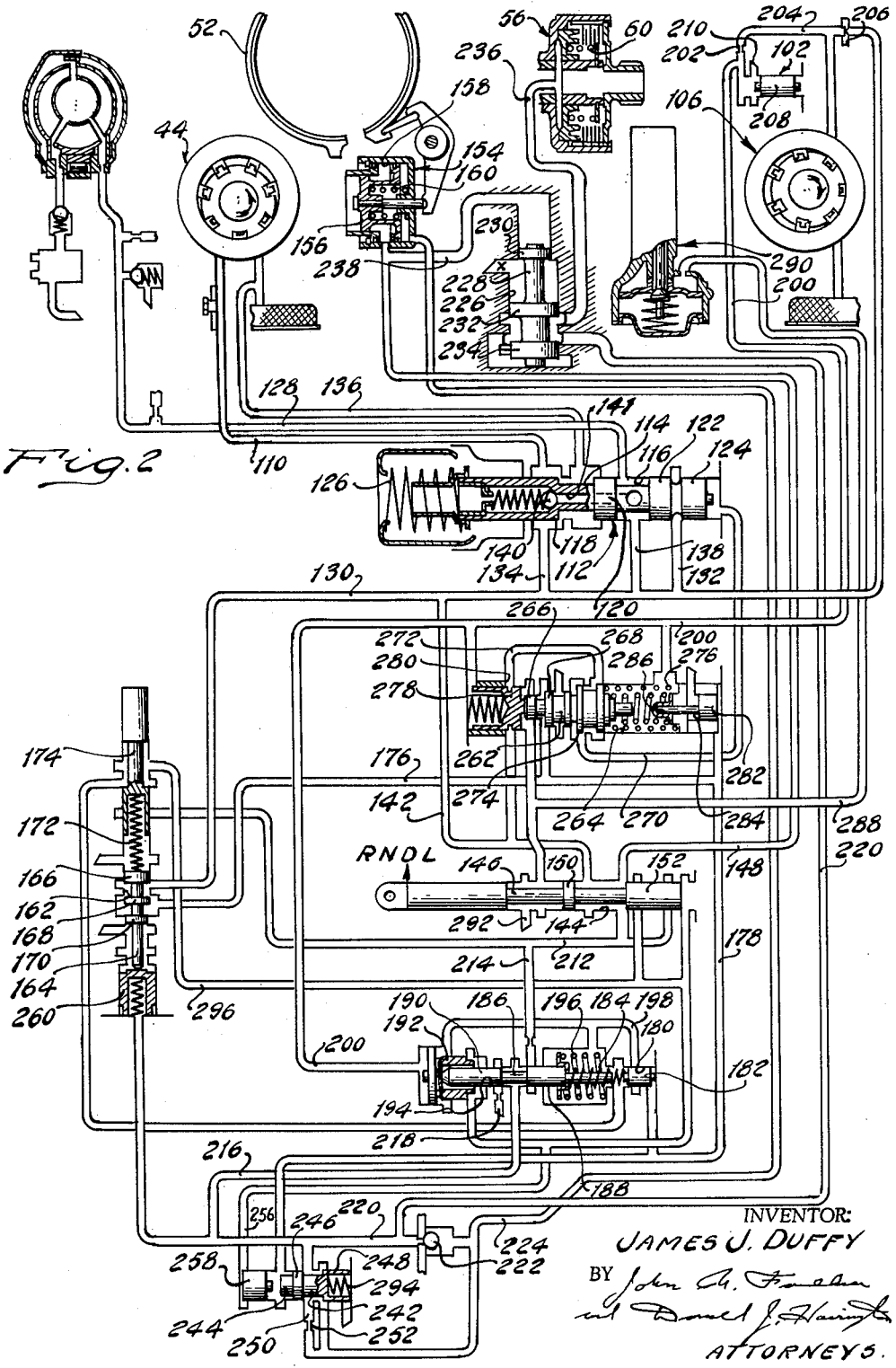
FIGURE 2 is a schematic assembly drawing of the control valves of which the improvement of my invention forms a part.

Referring next to FIGURE 2, I have illustrated in schematic form the principal elements of the automatic control circuit for controlling the action of the clutch and brake servos described in the foregoing paragraphs. A control pressure passage, shown at 110, communicates with a pressure regulator valve generally designated by reference character 112. This regulator valve includes a multiple land valve spool 114 slidably situated within a cooperating valve chamber 116. Valve spool 114 is formed with spaced valve lands 118, 120, 122 and 124 and is urged in a right-hand direction as viewed in FIGURE 2 by valve springs 126. The valve lands 122 and 124 are formed with different diameters and define a differential area that is subjected to the fluid pressure in passage 110. The resulting fluid pressure force opposes and balances the force of spring 126. Valve land 118 controls the degree of communication between passage 110 and a low pressure exhaust passage 128 that also communicates with valve chamber 116.

The differential area defined by valve lands 122 and 124 is in fluid communication with passage 110 through control pressure passage 130 and branch passages 132 and 134. The converter supply passage 128 communicates with passage 130 through branch passage 138. Valve land 120 controls the degree of communication between passage 138 and passage 128. The spacing of the valve lands on the valve spool 114 is such that the circuit pressure in passage 130 will be caused to increase to a minimum desired value before the converter is charged. At that time valve land 120 uncovers passage 128 to allow pressure to be distributed to the converter. After the desired charging pressure is obtained, valve land 118 uncovers the port communicating with passage 136, and thereafter the circuit pressure level is maintained at the desired value.

An emergency relief valve, as shown at 140, is urged into engagement with an internal passage 141 in the valve spool 114. This prevents the development of an excessive pressure in the converter or in the control circuit.

Passage 130 communicates with a control pressure passage 142 extending to a valve chamber 144 for a personally operable manual valve spool 146. Another passage 148 communicates also with chamber 144 and is in fluid communication with passage 142 through the annular space between valve lands 150 and 152 of the valve spool 146. Passage 148 in turn extends to the apply side of the low speed brake servo identified by reference character 154. The servo includes a double acting piston 156 that is positioned slidably within the cooperating cylinder 158.

The piston 156 cooperates with the cylinder 158 to define opposed working chambers. It is biased toward the released position by a piston return spring 160. The passage 130 communicates also with a throttle valve chamber 162 within which is situated a throttle valve spool 164. Valve lands 166, 168 and 170 are formed on spool 164, the diameter of the valve land 166 being greater than the diameter of valve land 170. Valve spool 164 is biased in a downward direction as viewed in FIGURE 2 by a valve spring 172 that is seated on the downshift valve 174, the latter being disposed in the valve chamber 162. Downshift valve 174 can be urged in a downward direction upon movement of the engine throttle toward an open position.

It is usual practice to provide a direct mechanical linkage between the engine throttle and the downshift valve 174 for the purpose of actuating the latter as engine torque demand changes.

A throttle pressure passage 176 communicates with valve chamber 162, and communication between passage 176 and passage 130 is controlled by valve land 168. The pressure in passage 176 acts upon the differential area defined by the valve lands 168 and 166. The resulting force opposes and balances the force of spring 172. Throttle valve spool 164 will establish a modulated pressure in passage 176 that hereafter will be referred to as throttle pressure.

Throttle pressure is distributed to passage 178 which extends to a throttle pressure reducer valve chamber 180 within which is situated a throttle pressure reducer valve element 182. This valve element is biased in a right-hand direction as viewed in FIGURE 2 by a valve spring 184 that acts against a shift valve spool 186. Valve spool 186 is formed with valve lands 188 and 190. A relatively large diameter valve plug 192 is fitted over the land 190. Shift valve 186 is positioned slidably within a cooperating shift valve chamber 194.

Valve chamber 180 communicates with the chamber 194 at a location adjacent the relatively large diameter valve plug 192. It communicates also with a spring chamber within which is disposed a shift valve spring 196 which urges the shift valve spool 186 in a left-hand direction as viewed in FIGURE 2.

The throttle pressure distributed through reducer valve element 182 is modulated at a reduced value so that the pressure made available to passage 198 is less than the magnitude of the pressure in passage 178. The pressure in passage 198, however, establishes a shifting force on the spool valve element 186 to supplement the force of spring 196.

The forces acting on the shift valve element 182 in a left-hand direction are opposed by a governor pressure force acting on the left-hand surface of valve plug 192. This governor pressure force is established in passage 200, the latter communicating with the aforementioned governor valve mechanism 102.

Pump 106 applies fluid pressure to the valve mechanism 102 through a flow restricting orifice 202. Passage 204 is provided for this purpose. Fluid flow from the passage 204 to passage 130 is inhibited by a check valve 206 but fluid flow to passage 130 from the pump 106 is permitted if the pressure in passage 204 should exceed the pressure in passage 130. During normal driving operation, however, the pressure in pump 44 exceeds the pressure in pump 106 and fluid flow from passage 130 to passage 204 is inhibited by the valve 206.

When the power output shaft rotates, a governor valve element 208 is urged under the influence of centrifugal force in a left-hand direction as viewed in FIGURE 2 thus tending to restrict communication between passage 204 and an exhaust port 210. This results in an increase in back pressure in passage 200. This back pressure is related functionally to the speed of the power output shaft and is an indicator of power output shaft speed.

It is apparent from the foregoing that the shift valve spool 186 will respond to variations in the governor pressure and the throttle pressure, the latter increasing upon an increase in engine torque demand and the former increasing upon an increase in vehicle speed.

Fluid pressure is distributed from passage 142 and through the manual valve chamber 144 to passage 212. This passage 212 communicates with passage 214 that in turn extends to shift valve chamber 194. Communication between passage 214 and the passage 216 is controlled by a valve land 188. When the valve element 186 is in the position shown, passage 216 is exhausted through an exhaust port 218. However, when the governor pressure force acting on the valve spool 186 exceeds the opposed forces, communication is established between passages 214 and 216. Control pressure then is distributed to passage 220 which communicates with the clutch servo. Control pressure is distributed also through one-way check valve 222 to a passage 224 that extends to the release side of the brake servo 154. When passage 224 is pressurized in this fashion, brake servo 154 will assume a brake release position.

The passage 220 that communicates with the clutch servo is connected to an interrupter valve chamber 226 within which is slidably positioned an interrupter valve element 228 having spaced lands 230, 232 and 234. The annular space between lands 232 and 234 provides communication between passage 224 and a passage 236 extending to the clutch servo working chamber 56. When the valve element 228 is in the position shown in FIGURES 2 and 3, the pressure that is made available to passage 220 is distributed to the lower side of valve element 228.

When the shift valve is shifted in a right-hand direction as viewed in FIGURE 2, passages 216 and 220 become pressurized as indicated. Pressure thus tends to build up on the release side of the brake servo 154 and in the clutch servo. The pressure acting in an upward direction on the valve spool 228 tends to increase accordingly. This pressure force is opposed by the force of line pressure acting upon the upper end of valve land 230. The branch passage 238 communicates with the upper end of valve chamber 226 to supply control pressure to the upper end of the valve land 230. The diameter of valve land 230 is smaller than the diameter of valve land 234. Thus, as pressure builds up on the release side of the brake servo 154 following movement of the shift valve, the valve element 228 will remain stationary until the pressure develops sufficiently to overcome the opposing force of the line pressure acting on land 230. When the pressure is sufficient to cause the valve land 234 to shift, it is moved upwardly as viewed in FIGURE 2 thus momentarily interrupting communication between passages 220 and 236. Application of the clutch thus is delayed during the time that the valve element 228 is being shifted. During such shifting movement, however, fluid pressure continues to build up on the release side of the brake servo 154. The delay in the corresponding build-up in the clutch servo results in a decrease in the duration of simultaneous engagement of the clutch and brake. The magnitude of this delay and the degree of overlap in the operation of the clutch and brake can be controlled by calibrating appropriately the interrupter valve structure. For example, if the size of land 230 were to be increased relative to the size of land 234, the initial pressure build-up in the clutch servo would be increased before a shift of the valve element would take place. Further, a restriction of suitable size may be provided in the exhaust port X to delay movement of the valve element 228.

During a downshift from a relatively high speed ratio to a lower speed ratio, the shift valve element 186 will be shifted in a left-hand direction as viewed in FIGURE 2. This will cause passage 216 to become exhausted. Since passage 220 communicates directly with passage 216 through the exhaust port 218 in the shift valve structure, fluid flow from the release side of the brake servo 154 during such a downshift will pass from passage 224 through a bypass passage 240. Check valve 222 prevents direct communication between passages 224 and 220 during a downshift.

An orifice control valve element 242 is situated in a valve chamber 244 that forms a part of passage 240. It includes spaced valve lands 246 and 248 that control communication between passage 240 and passage 220. A branch passage 250 is situated in parallel relationship with respect to passage 240 and includes a flow restricting orifice 252. When the valve element 242 assumes the position shown, free communication is established between passages 240 and 220. When the valve element 242 assumes a left-hand position, however, the flow of fluid from passage 240 must pass through the orifice 252.

Valve element 242 normally is biased in a left-hand direction as viewed in FIGURE 2 by a valve spring 254. The left-hand side of valve element 242 is subjected to throttle pressure that is supplied to chamber 244 by the aforementioned passage 178.

During normal operation under torque, the throttle pressure in passage 178 is sufficient to maintain the valve element 242 in a right-hand position. However, during a zero throttle downshift, the throttle pressure is insufficient to maintain valve element 242 in the position shown and spring 254 urges the same in a left-hand direction. Thus, the rate of engagement of brake servo 154 is decreased during a zero throttle downshift relative to the rate of release of the clutch.

To initiate a forced downshift, value 174 is urged in a downward direction as viewed in FIGURE 2 by the engine throttle linkage mechanism. As the engine throttle is moved to a wide open setting, communication is established between control pressure passage 212 and a spring chamber for the shift valve. Such a downshift can be accomplished rapidly since the downshift control valve is inoperative.

If the manual valve should be moved to the "L" position, the exhaust opening for a passage 256 in the manual valve will be closed, and this passage will be pressurized simultaneously since it is uncovered by land 152 to establish communication between passage 142 and passage 256. Pressure is distributed to the right-hand side of the shift valve plug 192 to maintain the shift valve in a low speed ratio position.

A detent element 260 is situated at one end of the throttle valve chamber 162 and is pressurized by the pressure made available to the clutch. Thus, the operator will experience a resistance when a forced downshift is initiated. This resistance is eliminated, however, when the clutch is de-energized. An inadvertent downshift at wide open throttle thus is prevented.

To provide a variation in the circuit pressure to compensate for changing engine torque demand, a compensator valve spool 262 is provided. This valve is positioned within a cooperating valve chamber 264 and is subjected at the right-hand end thereof to governor pressure made available by governor pressure passage 200. The throttle pressure from passage 176 is distributed to the differential area on valve element 262 defined by valve lands 266 and 268. A compensator pressure passage 270 communicates with valve chamber 264 and communication between passage 270 and a control pressure passage 272 is controlled by valve land 274. Passage 272 communicates with passage 142 as indicated.

A spring 276 acts upon the right-hand end of valve spool 262 thus supplementing the governor pressure force. Because of the balanced forces acting on the valve spool, a modulated compensator pressure is made available to passage 270. This pressure is distributed to the right-hand end of the valve land 124 of the regulator valve spool 114. Upon an increase in engine torque demand for any given vehicle speed, communication between passage 272 and passage 270 is decreased, thus reducing the compensator pressure in passage 270. This alters the regulating characteristics of valve element 114 thus causing an increase in the regulated line pressure. Conversely, if the vehicle speed should increase for any given throttle setting, the magnitude of the compensator pressure in passage 270 will increase and this in turn will result in a decrease in line pressure produced by valve element 114. When the vehicle speed obtains a certain predetermined value, the magnitude of the governor pressure in passage 200 is sufficient to urge the valve plunger 278 in a right-hand direction against the opposing force of the control pressure acting upon a differential area 280 on the valve plug 278. The valve plug is positioned in one end of the compensator valve chamber and is adapted to engage the compensator valve spool 262 when this predetermined vehicle speed is reached. Under these conditions, the governor pressure acting on the left-hand end of the valve spool 262 opposes and balances the governor pressure force acting on the right-hand end thereof so that the compensator valve is rendered insensitive to changes in vehicle speed when the vehicle is traveling at a speed greater than the calibrated maximum speed. This prevents the line pressure from dropping below an undesirably low value.

Changes in engine throttle setting correspond to changes in engine torque throughout the initial range of movement of the engine throttle. At higher engine throttle settings, however, changes in engine torque are not related to throttle position. A valve plug 282 thus is situated at the right-hand end of the compensator valve assembly and is subjected to the throttle pressure in passage 176. This pressure is opposed by a valve spring 284. When the engine throttle setting is sufficiently high, the force of valve spring 284 will be overcome and plunger 282 will be moved in a left-hand direction until an element 286 engages the end of the compensator valve spool 262. The throttle valve forces on plunger 282 thus oppose and balance the throttle pressure forces acting on the left-hand end of the compensator valve spool and the compensator mechanism is rendered insensitive to changes in engine throttle setting during operation at throttle settings greater than a predetermined value.

To condition the transmission mechanism for reverse drive, the manual valve element 146 is moved to the "R" position. This causes the passage 212 and passage 148 to become exhausted through the exhaust port at the end of the manual valve. Simultaneously, pressure is distributed from passage 142 to a passage 288, the latter extending to a reverse servo shown generally at 290. During forward drive operation, passage 288 is exhausted through an exhaust port 292 in the manual valve chamber 144. To increase the capacity of the servo 290 during reverse drive, pressure is distributed from passage 228 to the left-hand side of the compensator valve spool. This results in a decrease in the degree of communication between passage 272 and passage 270 and a decrease in the compensator pressure in passage 270. This results in an increase in the magnitude of the line pressure during reverse drive operation.

Having thus described the principal features of the improvement of my invention, what I claim and desire to secure by United States Letters Patent is:

1. In a valve system for controlling the operation of two fluid pressure operated servos, a fluid pressure source, conduit structure interconnecting said source and said servos, distributor valve means disposed in and partly defining said conduit structure for distributing selectively fluid pressure from said source to said servos, and timing valve means in a portion of said conduit structure for interrupting distribution of fluid pressure to one of said servos, said timing valve means comprising a movable valve element, one portion of said valve element being exposed to the fluid pressure made available to said one servo whereby said valve element is shifted, said valve element interrupting communication between said source and said one servo when it assumes one position along its path of shifting motion as it is shifted under the influence of pressure in said one servo.

2. In a valve system for controlling the operation of two fluid pressure operated servos, a fluid pressure source, conduit structure interconnecting said source and said servos, distributor valve means disposed in and partly defining said conduit structure for distributing selectively fluid pressure from said source to said servos, and timing valve means in a portion of said conduit structure for interrupting distribution of fluid pressure to one of said servos, said timing valve means comprising a movable valve element, one portion of said valve element being exposed to the fluid pressure made available to said one servo, another portion of said valve element being exposed to the fluid pressure of said source whereby opposed valve actuating forces on said valve element are developed, said valve element being shifted in response to changes in the magnitude of one pressure relative to another, said valve element interrupting communication between said source and said one servo when it assumes one position along its path of shifting motion as it is shifted under the influence of pressure in said one servo.

3. In a valve system for controlling the operation of two fluid pressure operated servos, conduit structure communicating with each servo, means for selectively pressurizing a portion of said conduit structure that is common to each servo, and timing valve means disposed in a portion of said conduit structure that extends to one servo, said timing valve means comprising a valve element that is shiftable between two extreme positions, one portion of said valve element being exposed to the pressure in said one servo and biased in one direction by the force developed thereby, said valve element retarding the fluid flow between said source and said one servo when said valve element assumes one position along its path of shifting motion as it shifts in response to a pressure buildup in such one servo.

4. In a valve system for controlling the operation of two fluid pressure operated servos, conduit structure communicating with each servo, means for selectively pressurizing a portion of said conduit structure that is common to each servo, and timing valve means disposed in a portion of said conduit structure that extends to one servo, said timing valve means comprising a valve element that is shiftable between two extreme positions, one portion of said valve element being exposed to the pressure in said one servo and biased in one direction by the force developed thereby, said valve element interrupting communication between said source and said one servo when said valve element assumes one position along its path of shifting motion, said valve element being exposed continuously to the pressure in said common portion, the pressure forces acting on said valve element being in opposition, said valve element being shifted in response to variations in the relative magnitude of the pressures acting thereon, said valve element having a relatively large valve land and a smaller valve land, the pressure in said one servo acting on the large valve land and the pressure in said common conduit portion being applied to said smaller valve land.

5. In a valve system for controlling the operation of two fluid pressure operated servos, conduit structure communicating with each servo, means for selectively pressurizing a portion of said conduit structure that is common to each servo, and timing valve means disposed in a portion of said conduit structure that extends to one servo, said timing valve means comprising a valve element that is shiftable between two extreme positions, one portion of said valve element being exposed to the pressure in said one servo and biased in one direction by the force developed thereby, said valve element interrupting communication between said source and said one servo when said valve element assumes one position along its path of shifting motion, said valve element being exposed continuously to the pressure in said common portion, the pressure forces acting on said valve element being in opposition, said valve element being shifted in response to variations in the relative magnitude of the pressures acting thereon, said valve element having a relatively large valve land and a smaller valve land, the pressure in said one servo acting on the large valve land and the pressure in said common conduit portion being applied to said smaller valve land, said valve element being situated within a valve chamber, an exhaust port communicating with said valve chamber, the portion of said valve chamber intermediate said relatively large valve land and said smaller valve land being in communication with said exhaust port.

References Cited in the file of this patent
UNITED STATES PATENTS
1,999,834    Ernst _____ Apr. 30, 1935